(12) United States Patent
Hamilton, II et al.

(10) Patent No.: US 7,996,164 B2
(45) Date of Patent: Aug. 9, 2011

(54) MANAGING ENERGY USAGE BY DEVICES ASSOCIATED WITH A VIRTUAL UNIVERSE RESOURCE CONSERVATION REGION

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 12/115,958

(22) Filed: May 6, 2008

(65) Prior Publication Data

US 2009/0281743 A1    Nov. 12, 2009

(51) Int. Cl.
*G01R 21/00*    (2006.01)
(52) U.S. Cl. ............... 702/61; 340/3.9; 702/62
(58) Field of Classification Search .......... 702/60, 702/61, 62, 182, 188; 705/34, 412, 413; 700/291, 295; 345/344; 340/3.9
See application file for complete search history.

(56) References Cited

U.S. PATENT DOCUMENTS

| | | | |
|---|---|---|---|
| 5,736,990 A | 4/1998 | Barrus et al. | |
| 5,879,236 A | 3/1999 | Lambright | |
| 6,072,498 A | 6/2000 | Brittain et al. | |
| 6,256,043 B1 | 7/2001 | Aho et al. | |
| 6,327,541 B1 * | 12/2001 | Pitchford et al. | 702/62 |
| 6,598,029 B1 | 7/2003 | Johnson et al. | |
| 6,631,309 B2 | 10/2003 | Boies et al. | |
| 6,672,961 B1 | 1/2004 | Uzun | |
| 6,767,287 B1 | 7/2004 | Mcquaid et al. | |
| 6,785,592 B1 | 8/2004 | Smith et al. | |
| 6,937,946 B1 * | 8/2005 | Culp et al. | 702/62 |
| 7,096,360 B1 | 8/2006 | Fries | |
| 7,135,956 B2 * | 11/2006 | Bartone et al. | 340/3.9 |
| 7,171,287 B2 | 1/2007 | Weiss | |
| 7,358,973 B2 | 4/2008 | Herbrich et al. | |
| 2002/0062177 A1 | 5/2002 | Hannaford et al. | |
| 2003/0057884 A1 | 3/2003 | Dowling et al. | |
| 2003/0210271 A1 | 11/2003 | King | |

(Continued)

FOREIGN PATENT DOCUMENTS

JP    2003061263    2/2003

OTHER PUBLICATIONS

Trefftz, Helmuth et al., "Local and Global Impact of Message Caching in Shared Virtual Environments", *Proceedings of the IASTED International Conference on Computer Graphics and Imaging 2000 (CGIM 2000)* Las Vegas, NV Nov. 20, 2000 , 8-13.

(Continued)

*Primary Examiner* — John H Le
(74) *Attorney, Agent, or Firm* — DeLizio Gilliam, PLLC

(57) ABSTRACT

A virtual universe can include regions that conserve natural resource usage. A virtual universe natural resource conservation system can determine a measure of comprehensive energy usage of a plurality of devices associated with a controlled energy use region in a virtual universe. The system can determine that the measure of comprehensive energy usage approaches a usage threshold for the controlled energy use region. The system can also impose one or more conservation limitations on at least one of the plurality of devices to maintain the comprehensive energy usage within the usage threshold.

20 Claims, 6 Drawing Sheets

U.S. PATENT DOCUMENTS

| | | |
|---|---|---|
| 2004/0098142 A1 | 5/2004 | Warren et al. |
| 2004/0215536 A1 | 10/2004 | Deliwala et al. |
| 2004/0254899 A1 | 12/2004 | Abe et al. |
| 2005/0024362 A1 | 2/2005 | Klein |
| 2005/0033601 A1 | 2/2005 | Kirby et al. |
| 2005/0165512 A1 | 7/2005 | Peljto |
| 2006/0135261 A1 | 6/2006 | Kinne et al. |
| 2007/0005466 A1 | 1/2007 | Rosenblatt et al. |
| 2007/0061201 A1 | 3/2007 | Ellis et al. |
| 2007/0097206 A1 | 5/2007 | Houvener et al. |
| 2007/0219645 A1 | 9/2007 | Thomas et al. |
| 2007/0244604 A1 | 10/2007 | McNally |
| 2008/0177423 A1 | 7/2008 | Brickfield et al. |
| 2008/0255899 A1 | 10/2008 | McConnell et al. |
| 2008/0313011 A1 | 12/2008 | Rose et al. |
| 2009/0063228 A1 | 3/2009 | Forbes |
| 2009/0109229 A1 | 4/2009 | Hamilton, II et al. |
| 2009/0113338 A1 | 4/2009 | Hamilton, II et al. |
| 2009/0113421 A1 | 4/2009 | Hamilton, II et al. |
| 2009/0278841 A1 | 11/2009 | Hamilton, II et al. |
| 2009/0281885 A1 | 11/2009 | Castelli et al. |
| 2009/0281886 A1 | 11/2009 | Castelli et al. |
| 2010/0050004 A1 | 2/2010 | Hamilton, II et al. |
| 2010/0052872 A1 | 3/2010 | Boss et al. |
| 2010/0057529 A1 | 3/2010 | Boss |
| 2010/0057625 A1 | 3/2010 | Boss et al. |
| 2010/0057641 A1 | 3/2010 | Boss et al. |
| 2010/0058350 A1 | 3/2010 | Boss et al. |
| 2010/0083107 A1 | 4/2010 | Allen et al. |

OTHER PUBLICATIONS

U.S. Appl. No. 11/931,826, Hamilton, II, Rick A.
U.S. Appl. No. 11/932,114, Hamilton, II, Rick A.
U.S. Appl. No. 11/932,319, Hamilton, II, Rick A.
U.S. Appl. No. 12/115,963, Hamilton, II, Rick A.
U.S. Appl. No. 12/194,633, Hamilton, II, Rick A.
U.S. Appl. No. 12/203,329.
U.S. Appl. No. 12/203,345.
U.S. Appl. No. 12/203,366.
U.S. Appl. No. 12/203,379.
U.S. Appl. No. 12/203,399.
U.S. Appl. No. 12/239,378.
"U.S. Appl. No. 12/117,348 Office Action", May 12, 2010, 12 pages.
"U.S. Appl. No. 11/932,114 Office Action", Oct. 29, 2010, 18 pages.
"U.S. Appl. No. 12/117,360 Office Action", Mar. 25, 2011, 23 pages.
"U.S. Appl. No. 11/932,319 Office Action", May 26, 2011, 22 pages.

* cited by examiner

US 7,996,164 B2

MANAGING ENERGY USAGE BY DEVICES ASSOCIATED WITH A VIRTUAL UNIVERSE RESOURCE CONSERVATION REGION

BACKGROUND

Embodiments of the inventive subject matter relate generally to virtual universe systems that, more particularly, manage energy usage by devices associated with a virtual universe resource conservation region.

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

A virtual universe can include regions that conserve natural resource usage. A virtual universe natural resource conservation system can determine a measure of comprehensive energy usage of a plurality of devices associated with a controlled energy use region in a virtual universe. The system can determine that the measure of comprehensive energy usage approaches a usage threshold for the controlled energy use region. The system can also impose one or more conservation limitations on at least one of the plurality of devices to maintain the comprehensive energy usage within the usage threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF THE EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to "regions" in a virtual universe that conserve energy, other examples can refer to areas of the virtual universe that are larger or smaller than a region, membership to avatar conservation groups within the virtual universe, etc. In other instances, well-known instruction instances, protocols, structures and techniques have not been shown in detail in order not to obfuscate the description.

Introduction

Figure 1:
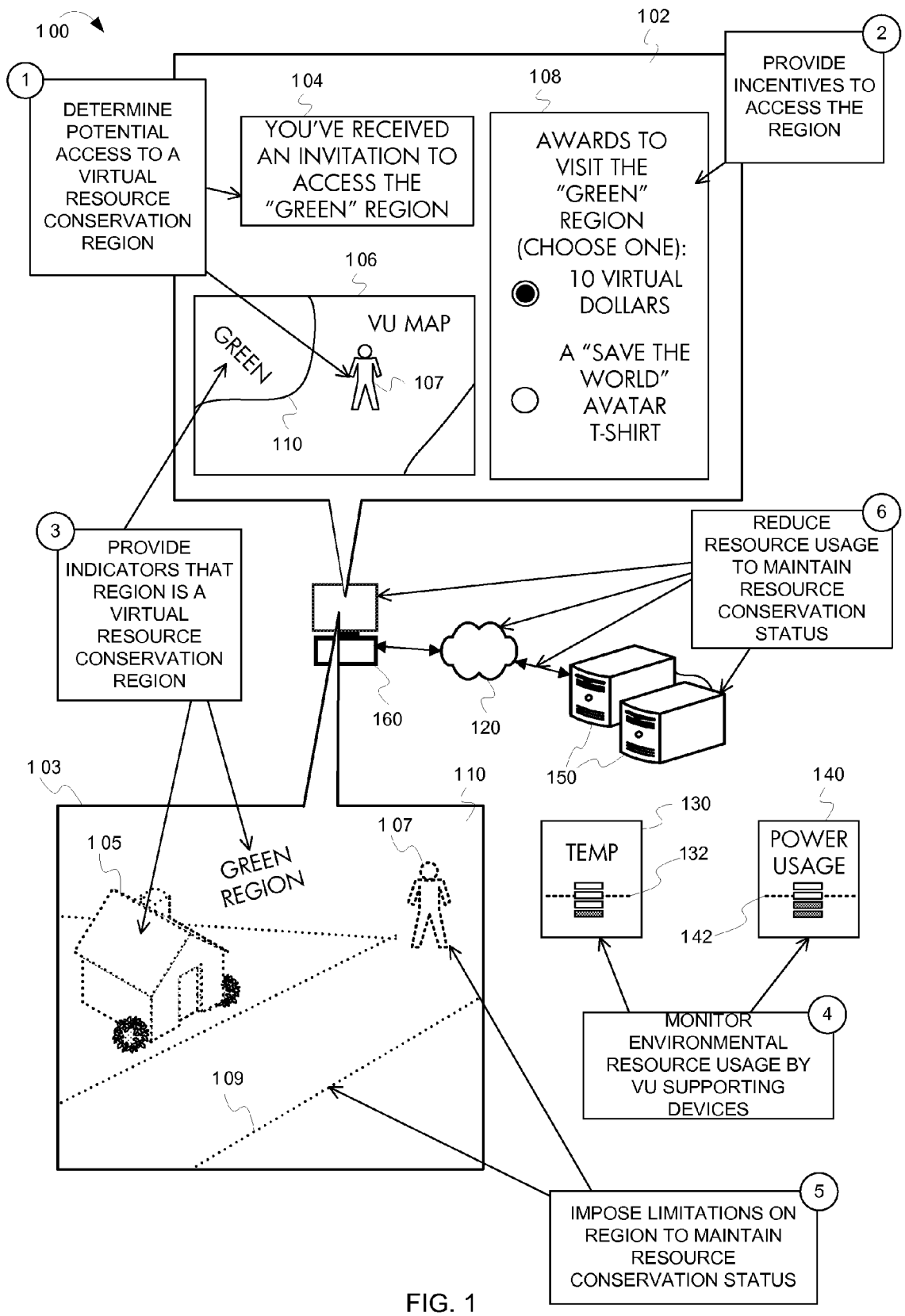
FIG. 1 is an example illustration of controlling a virtual resource conservation region.

VU providers work hard to create virtual worlds that are interesting, and usually different from the real world, so that VU users can immerse themselves in an experience that is different from the real world. However, VUs still run on energy derived from the real world and VU users represent real-life individuals that consume real-life resources. Some VU providers and VU users are concerned with the "greenness" of their VU usage. "Greenness" is a short-hand term that describes a measure of some thing's impact on the environment. The more "green" some thing is, the more environmentally friendly it is considered to be. FIG. 1 shows how a computer system, according to some embodiments, can promote a "green" region in a virtual universe that can conserve real world resources.

FIG. 1 is an example illustration of controlling a virtual resource conservation region ("green region") 110. In FIG. 1, a virtual universe natural resource conservation system ("system") 100 includes a client 160, one or more servers 150, and a communication network 120. The servers 150 serve a virtual universe network by processing and providing data that the client 160 can process, rendering one or more VU displays 102, 103. One VU display 102 can present a graphical user interface (GUI) with map displays, inventory controls, configuration settings, chat screens, etc. The client 160 can also render a VU display 103 displaying an avatar 107 within a green region 110 of the VU.

The system 100 is configured to monitor and control the green region 110. The green region 110 is a region in the VU that is supported by devices (e.g., the servers 150, the client 160, other devices not shown) that adhere to limitations on natural resource usage, such as restrictions on overusing natural resources. The green region 110 strives to use fewer natural resources than other regions in the VU. The system 100 monitors (e.g., measures) usage of real world natural resources (e.g., overall energy usage to operate the devices, the origin and cleanliness of the energy usage, the degree of heat production of devices, etc.) associated with the green region 110. The devices can have one or more gauges 130, 140, that measure the natural resource usage. The system 100 restricts the usage of the natural resources by the devices to maintain the usage within one or more usage thresholds 132, 142. Multiple usage thresholds can be combined into a single "greenness" score, or rating, based on one or more measurements of natural resource usage. A VU provider may establish its own scoring criteria and usage thresholds for maintaining one or more green regions within the VU grid. Alternatively, organizations outside of the VU (e.g., a governing body, a regulatory group, a business association, etc.) may also establish greenness scoring criteria, ratings and/or usage thresholds as a standard to which a VU provider can adhere to maintain green regions within the VU grid.

The system 100 can promote the green region 110 to avatars within the VU. For example, the system 100 can indicate the green region 110 to avatars within the VU so that the avatar owners know which regions are more resource friendly. The system 100 can also provide incentives, or awards, to entice avatars to visit the green region 110 instead of non-green regions. For instance, the system 100 can first detect when an avatar 107 is likely to access the green region 110. One way for the system 100 to detect that the avatar 107 is likely to access the green region 110 is that the system 100 can detect an invitation 104 sent to the avatar 107 to visit the green region 110. Another way for the system 100 to detect that the avatar 107 is likely to access the green region 110 is that the system 100 can track the movement of the avatar 107 in a map 106 and determine when the avatar 107 is within a pre-determined proximity to the green region 110 (e.g., when an avatar is within a certain VU coordinate range). The system 100 can then present potential awards to entice the avatar 107 into the green region 110. For instance, the system 100 can present an awards list 108 showing possible awards that the avatar 107 can receive for visiting the green region 110. The system 100 can assign the awards to the avatar 107 and/or to a VU user account associated with the avatar 107. The avatar 107 can redeem the awards within the VU. Award restrictions may be applied such as duration or interaction requirements, and the award may be offered to a user a limited number of times.

The system 100 can provide indicators within the VU to identify and promote the green region 110. The indicators provide notice to the visiting avatar 107 that the region is a green region. The indicators can be presented within the VU user interface (e.g., VU display 102) as images, video, sounds, text messages, etc. For example, some indicators may include a visual indication on the map 106 of the VU that sets the region apart as a green region. The system 100 can also indicate the green region with the invitation 104 to visit the green region. Further, the system 100 can display one or more items or characteristics (e.g., colors, backgrounds, textures, sign posts, etc.) within the green region 110 that indicate the region as a green region.

The system 100 can monitor the devices (e.g., client 160, server 150, etc.) at all times to ensure that the measure of natural resource usage stays within the one or more usage thresholds 132, 142. The system 100 can measure resource usage in many ways. For example, the system 100 can measure direct power usage, as in the gauge 140. The gauge can be associated with the devices 160, 150 as hardware and/or software contained within and/or connected to the devices 160, 150. The gauge 140 monitors power usage and prevents the power usage from reaching an upper limit of usage indicated by the threshold 142. Additionally, the system 100 can measure indirect resource usage, such as a "heat" measurement, as in gauge 130. The higher the heat production, the more the system 100 has to use power to cool the devices 160, 150. As a result, the gauge 130 monitors the temperature of the devices (e.g., as a comprehensive measure for all devices, as individual measurements for individual devices, etc.) and sets an upper measurement limit indicated by the threshold 132.

When the system 100 detects that the gauge measurements are approaching the thresholds 132, 142, the system 100 can take actions and/or impose limitations that will maintain resource usage within the thresholds 132, 142. As an example, the system can reduce the image quality of region items and characteristics, like the house 105, the landscape 109, and the avatar 107. The system 100 can also restrict the activities of the avatar 107, or other objects within the green region 110. The system 100 can also directly access the devices 150, 160 and cause them to reduce natural resource usage (e.g., dim their display brightness, produce less VU data, delay network communications, shift to a power-save mode, etc.). The system 100 can take actions based on the type of resource usage and/or impose conservation limitations in a way that directly affects a specific measurement. For example, if the system 100 measures a power over usage, the system 100 can reduce image processing and/or data production on the servers. On the other hand, if the system 100 measures an over usage of energy from power providers known to produce energy in unclean ways, or that produce high levels of environmental pollutants, the system 100 can switch to a local power grid or energy producer that produces clean energy (e.g., solar, water, wind energy) versus high-polluting energy (e.g., fossil fuel energy), subject to the capability of the power utilities and infrastructure.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). Moreover, some embodiments can perform more or less than all the operations shown in any flow diagram.

Figure 2:
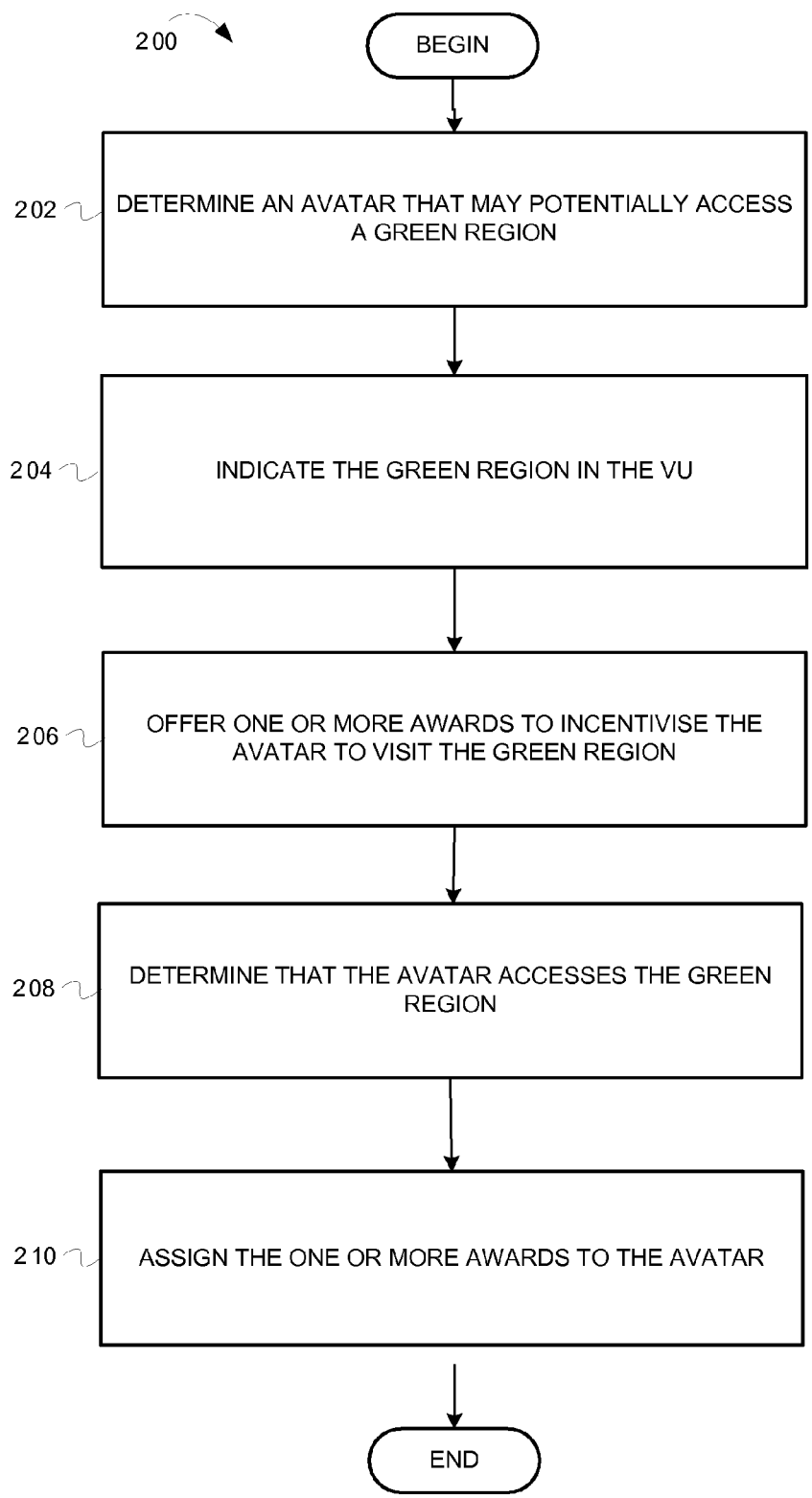
FIG. 2 is an example flow diagram 200 illustrating promoting virtual resource conservation regions.

FIG. 2 is an example flow diagram illustrating promoting virtual resource conservation regions. In FIG. 2, the flow 200 begins at processing block 202, where a virtual universe natural resource conservation system ("system") determines an avatar that may potentially access a green region in a VU. The system can determine that an avatar may potentially access the green region in many ways. FIG. 1 discussed a few examples of when an avatar may have potential access to the green region such as an avatar's proximity to the region or an invitation to visit the region. It is common within a virtual universe for users to be extended invitations to teleport to a region. A teleport is a transit from one region of a virtual universe to another without requiring the user to move through the intervening regions. The system can detect when an avatar receives a teleport invitation to a green region. Environmentally conscientious avatars may opt to only accept teleport invitations to green regions. Other ways of determining that an avatar may potentially access a green region includes determining when an avatar receives a communication from another avatar discussing the green region or determining when an avatar requests information about the green region.

In some embodiments, the system may need to determine that the region that the avatar may potentially access is a green region. One way to detect a green region is to detect a certificate from an authority (e.g., a global authority, a private authority, a self-regulated group, etc.) designating the region as green region. To receive the certificate, the system can provide metrics to the authority indicating a level of conservation within the region. If the metrics meet requirements established by the authority, the authority can grant the certificate. The authority can also assign a conservation level, or a greenness score, to the region. After receiving the certificate, the system can store and associate the certificate with the region. Any device that accesses, or potentially accesses, the region can detect the certificate. If a greenness score is stored on the certificate, the system can also detect that score and use the score to determine indicators to present and limitations to impose. The system, however, does not have to look for a certificate from an authority but instead could determine whether devices that support a region meet a level of conservation and tag the region as a green region. For example, the system can review power consumption characteristics of devices that power the region. The system can compare the power consumption characteristics to rules that categorize natural resource conservation. Power consumption characteristics can include, but not be limited to, electrical consumption, electrical consumption efficiency per avatar, heat output, system resource utilization, etc. The system can also check configuration files, stores, or lookup tables that indicate the type or origin of a power provider (e.g., could indicate what servers are getting green power, electrical characteristics, etc.) When the system determines that the region is a green region, the system can watch for avatars that might potentially access the green region.

The flow 200 continues at processing block 204, where the system indicates the green region within the VU. The system can provide indicators within the VU that the region is designated as a green region. Some examples of indicators can include notification messages or images within a client graphical user interface (GUI), text in a status bar, pop-up windows, etc. The indicators can be based on a natural resource conservation score (e.g., a dash-board graphic could show a meter indicating a degree of conservation). The indicators can be color based (e.g., a green light shows a green area, a red light shows a non-green area). The indicators can be special boundaries or items that can be seen from outside of the green area, such as a tree boundary or a special sky color. If an avatar is "flying" in the VU or observing a bird's eye map view of the VU, green regions below may be tinted green. If the user receives an invitation to teleport to a green region, or is in the act of teleporting to a green region, the system can display an indicator in a teleport window. The system can also indicate the green region based on user preferences associated with a VU user account. For instance, the system can evaluate an account profile associated with the avatar. The account profile can have settings set by a VU user account indicating preferences for visiting green regions (e.g., a preference setting to notify an avatar when a green region first becomes active or has vacancy, a preference setting indicating a desire to receive invitations only to green regions, etc.) The system can then notify the avatar of a green region based on the preference settings.

The flow 200 continues at processing block 206, where the system offers one or more awards to incentivize the avatar to access the green region. Some avatars may not be as interested as others in spending time in a green region. Consequently, the system can attempt to promote the green region with one or more offers for awards. Some examples of awards may include VU money or credits, VU items, additional avatar abilities, reduction in subscription fees, carbon credits, etc. The system can detect user preferences stored on a profile for specific types of rewards that an avatar may prefer. The system can present specific awards based on the preferences. The system can also determine an avatar's past history of activity to determine awards. For example, if an avatar has never visited a green region, the system may determine a very enticing award to offer the avatar. As the avatar visits green regions more frequently, the system can offer less enticing awards as the avatar becomes more environmentally aware. Alternatively, the system may determine that the avatar has a history of environmental conservation inside and/or outside of the VU, and consequently offer that avatar a more valuable award. In some embodiments, the system may offer more valuable awards based on the avatar's popularity, abilities, services, etc.

The flow 200 continues at processing block 208, where the system determines that the avatar accesses the green region. The system can track the movement of the avatar and determine if the avatar enters the green region. Once within the green region, the system can provide one or more indicators within the green region so that the avatar can understand, at a glance, that it is traversing a green region. The indicators within the green region may include specialized landscaping (e.g., minimal landscaping, specially colored landscaping, etc.), a green light or other designations on the VU GUI, special avatar functions or abilities (e.g., avatars with a green tint, avatars with the ability to display an environmental friendliness score, etc.), sounds like "rushing water" or "wind through trees", signs, etc. The system can also indicate natural resource usage within the VU in a way that indicates real-world resource usage (e.g., as a resource usage measure approaches a usage threshold, the system can graphically depict increasing temperatures within the green region to represent virtual global warming, change the region's sky color to indicate real-world pollution levels, etc.)

The flow 200 continues at processing block 210, where the system assigns the award to the avatar. When the avatar accesses the green region, the system can assign the award to the avatar directly (e.g., put an avatar item into the avatar's inventory, assign special abilities or privileges to the avatar, etc.). The system can also assign the award to a VU account associated with the avatar (e.g., reduce subscription fees, augment the user account with VU money, etc.)

In some embodiments, the operations can be performed in series, while in other embodiments, one or more of the operations can be performed in parallel. For example the system can indicate green regions in the VU, as a default setting, before determining that an avatar can potentially access the green region (e.g., a green region on a VU map is always colored green to indicate the green region). Alternatively, the system can indicate the green region only after determining that an avatar can potentially access the green region (e.g., a green region on a VU map doesn't appear green until the avatar gets within a specified proximity to the green region).

Figure 3:
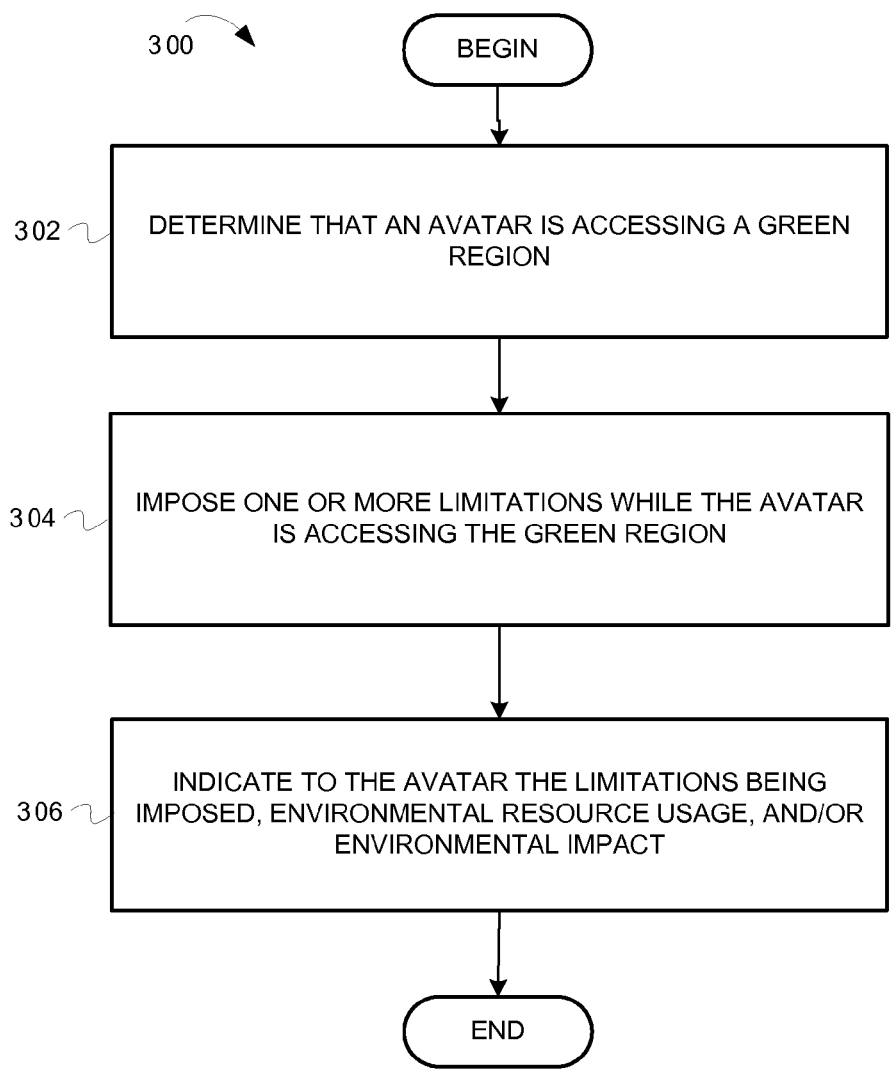
FIG. 3 is an example flow diagram 300 illustrating imposing limitations on a virtual resource conservation region.

FIG. 3 is an example flow diagram illustrating imposing limitations on a virtual resource conservation ("green") region. In FIG. 3, the flow 300 begins at processing block 302, where a virtual universe natural resource conservation system ("system") determines that an avatar is accessing a green region. The system can determine when an avatar is in a region by tracking the current coordinates associated with a unique universal identifier (UUID) for the avatar. The system can compare the current coordinates of the avatar associated with the UUID to grid coordinates defining the green region's boundaries within the VU. The system can keep track of any number of avatars within the region, as well as historical information of when avatars usually visit the regions, avatar traffic patterns, and general avatar activities within the region.

The flow 300 continues at processing block 304, where the system imposes one or more limitations while the avatar is accessing the green region. The system can impose many different types of limitations. For example, the system can set time limits for avatar access. The time limits can reduce computational load and decrease energy consumption by reducing the time that an avatar is in the green region. Another way for the system to impose limitations is to remove avatars after a specified duration within the region. The removal of an avatar enables new avatars to transit to the region, and removal keeps the population below a threshold, thereby maintaining a desired resource usage. Other embodiments may remove the avatar that has been there the longest when a new avatar seeks entrance to the region. Some embodiments may combine the two techniques, allowing avatars to visit for at least a set duration. In such an embodiment a "waiting list" may be created for those wishing to enter a green region that is full. Each avatar within the region may stay for their duration at which point they may be forced out of the region and the first avatar waiting may enter in their place.

In some embodiments, as a time limit approaches, the system may provide the avatar with a warning. If the avatar wishes to remain in the region, the avatar may provide compensation to stay (e.g., avatar pays money to offset carbon emissions, the avatar donates money to alternative energy companies, etc.) If the user does not pay, several actions may be taken. For example, the avatar's account may be logged off the VU, the avatar may be teleported to a region supported by a low-energy server, the avatar's mobility may be restricted and/or his rendering degraded. Other limitations imposed by the system can include, general image quality restrictions, penalties (e.g., real world currency payments, game currency deductions, carbon measurement credit points, subscription fee increases, etc.), teleportation restrictions, selective removal of avatars, restrictions on avatar activity, restrictions on data transmitted to a client associated with an avatar, etc.

In some embodiments, if an avatar is teleporting to a region, and the region is determined to be a green region, the system can modify the teleportation request according to limitations set on the region. For example, if the system is overburdened and/or if one or more limitations are in effect (e.g., a time schedule is enabled limiting visitation during specific times, a population load level is restricting avatar access to the green region, etc.) the system can offer an avatar alternative regions to visit, deny the teleport request, re-route the teleport to a similar region, etc. An administrative account can enforce the limitations manually. Alternatively the system can monitor the system and enforce the limitations automatically. The system can also impose limitations that comport with user preferences. For instance, an avatar may have user account settings indicating a preference for limitations, or a preferred order in which limitations can be imposed, when necessary.

The flow 300 continues at processing block 306, where the system indicates to the avatar the limitations being imposed, resource usage measurements, or environmental impact related to the resource usage. The system can provide one or more notifications to the avatar, within the virtual universe, that the one or more virtual universe limitations are applied in the green region. The system can also indicate natural resource usage within the VU in a way that corresponds to resource over usage and/or environmental impact (e.g., as a system temperature measure approaches a threshold, the system can graphically depict increasing temperatures in the VU to represent virtual global warming; as a power provider indicator approaches a measurement increase of unclean power plant energy production, the system can change the sky color of the green region to indicate pollution; etc.)

In some embodiments, the operations can be performed in series, while in other embodiments, one or more of the operations can be performed in parallel. For example, the system can impose limitations that affect an avatar immediately upon entering a green region. In another example, the system can indicate the limitations to the avatar before imposing the limitations on the avatar to give the avatar a chance to offer a compensation that will delay or prevent the limitations from being imposed.

Figure 4:
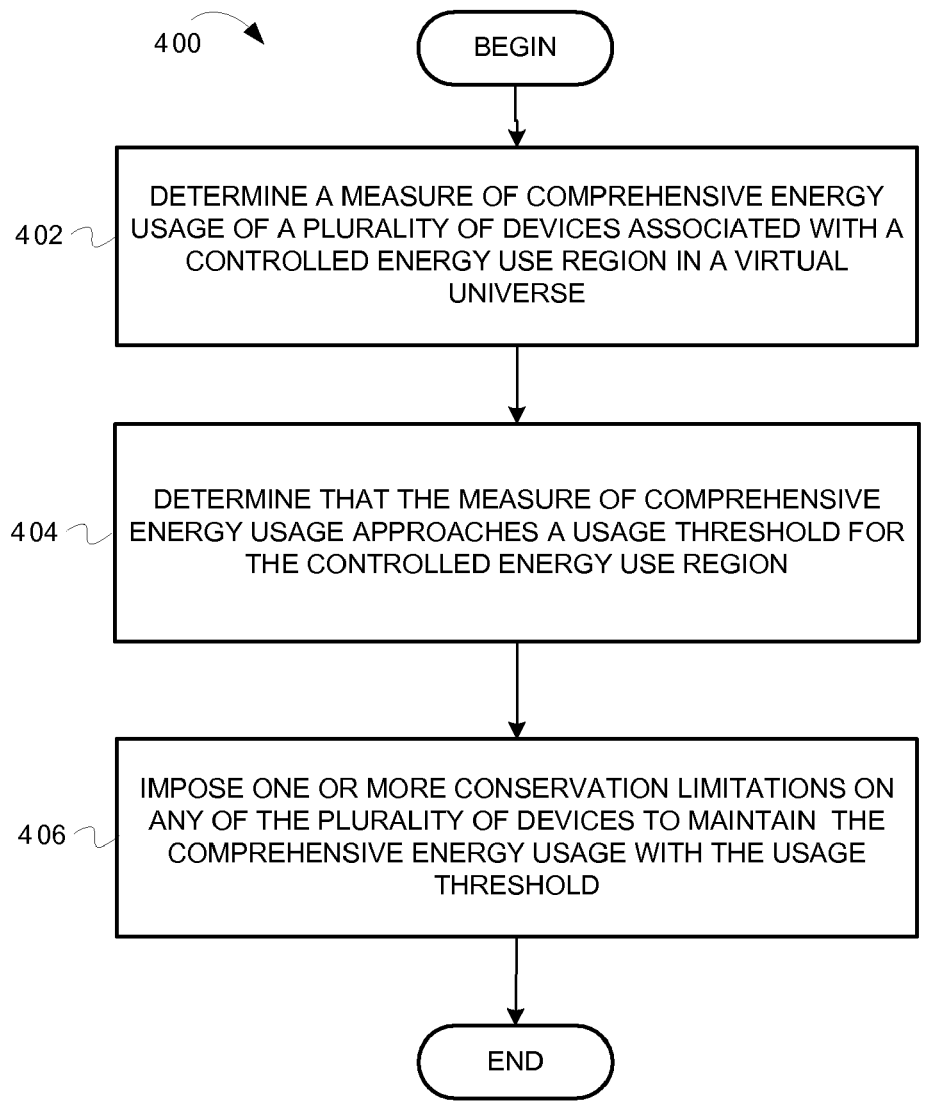
FIG. 4 is an example flow diagram 400 illustrating managing comprehensive energy usage for a controlled energy use region.

FIG. 4 is an example flow diagram illustrating managing comprehensive energy usage for controlled energy use regions. In FIG. 4, the flow 400 begins at processing block 402, where a virtual universe natural resource conservation system ("system") determines a measure of comprehensive energy usage of a plurality of devices associated with a controlled energy use region in a virtual universe. A controlled energy use region can be one type of green region that limits the amount of energy (e.g., total energy use, energy use per avatar within the region, energy use per period, etc.) or type of energy (e.g., clean versus unclean energy, stored versus direct energy, renewable versus fossil fuel energy, etc.) used to support the green region. For instance, the system can determine a client device's power usage compared to energy usage at a server site, and combine the two to generate the comprehensive energy usage. The system can determine respective power usage by devices on the system and adjust comprehensive energy determination factors accordingly. For example, if the servers produce significantly more energy than the client(s) at certain times, or for specific activities, the system can more carefully track the server site power usage at those times.

The system can also determine which of the client or server devices is running inefficiently (e.g., one of the devices is running insignificant background processes, one of the devices is running in a full power mode, one of the devices is powering excessive hardware devices, one of the devices is constantly peaking its processor usage or memory access, etc.). Based on the inefficiency, the system can identify the most inefficient device. The system can then impose more conservation limitations on the device that is operating less efficiently. The system can use monitoring devices (e.g., gauges, meters, etc.) associated with the plurality of devices associated with the controlled energy use region. The monitoring devices can have measurement limits, or thresholds, associated with them. The monitoring devices can be hardware, software, and/or a mixture of both. In some embodiments, the monitoring devices can be located at the physical site where the plurality of devices use energy. In other embodiments, however, the monitoring devices may be off-site, for example, at one or more energy provider facilities. The system can subscribe to energy usage data from the one or more energy providers. The system can receive the data from multiple energy providers, such as energy providers for client devices and for server devices.

The flow 400 continues at processing block 404, where the system determines that the measure of comprehensive energy approaches a usage threshold for the controlled energy use region. The system can determine what a power usage measure consists of (e.g., is it measuring power over usage, heat production, a "greenness" usage, a time of day for power usage, etc.) The system can make multiple measurements of the power usage and indicate as the comprehensive power usage approaches one or more threshold levels. The system can react to maintain the comprehensive power usage within the one or more thresholds.

The flow 400 continues at processing block 406, where the system imposes one or more conservation limitations on any of the plurality of devices to maintain the comprehensive energy usage with the usage threshold. For example, the system can detect a client's power consumption based on client device metrics, settings, and profile (e.g., processor clock speed, graphics card properties, memory usage, mother-board characteristics, fan speed, etc.) The system can accordingly restrict power usage for the client device if the client device is overusing or inefficiently using power, or has a history of over consumption. For example, the system can force avatars associated with the client into green regions of the VU or reduce image quality on a specific client. The system can determine when to reduce client energy usage versus server energy usage, or vice versa. For example, if a client device is the greater abuser of power or greenness, then the system can restrict the client's image quality in rendering the region or reduce that particular avatar's abilities versus having to restrict data processing at the server for the entire region. Further, the system can restrict activities in the VU according to degrees (e.g., as a power usage approaches a usage threshold, the system can reduce activities with more aggressiveness and/or in a specific order that minimizes the impact on the region).

In some embodiments, the operations can be performed in series, while in other embodiments, one or more of the operations can be performed in parallel. For example the system can impose conservation limitations on the plurality of devices immediately upon accessing or being assigned to support the controlled energy use region. The system can then determine the comprehensive energy usage by the plurality of devices and determine how the devices are individually contributing to an approach on the usage threshold. The system can then impose more conservation limitations based on which of the devices are causing the greatest impact on the energy usage.

Additional Example Operating Environments

This section describes example operating environments, systems and networks, and presents structural aspects of some embodiments.

Example Virtual Universe Resource Conservation Network

Figure 5:
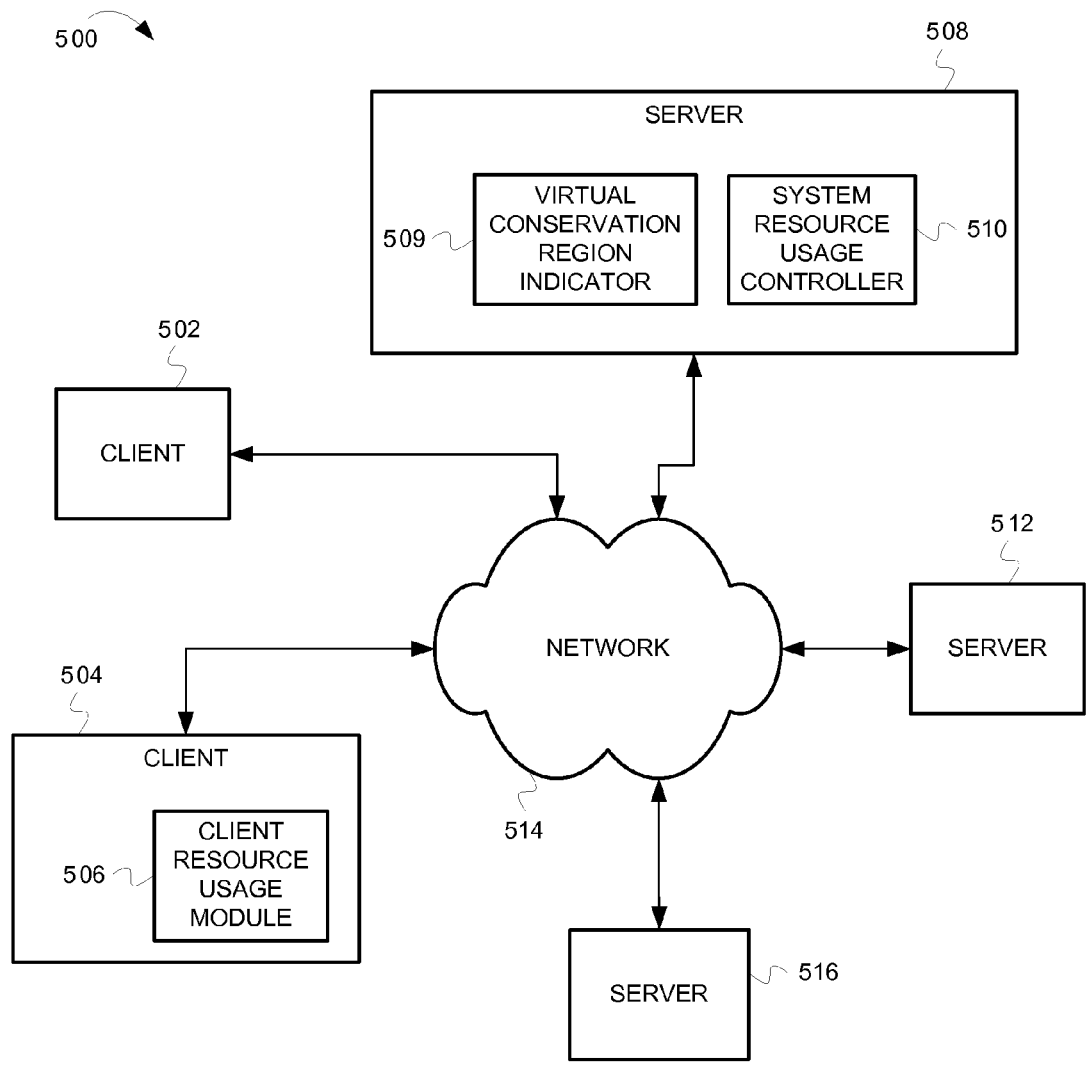
FIG. 5 is an illustration of an example networking environment.

FIG. 5 is a block diagram illustrating a networking environment. The system 500 can include multiple client devices ("clients") 502 and 504 connected to multiple servers 508 and 512 via a network 514. The network 514 can be a local area network (LAN), a wide area network (WAN), a telephone network, such as the Public Switched Telephone Network (PSTN), an intranet, the Internet, or a combination of networks. For simplicity, the system 500 shows only two clients 502 and 504 and three servers 508, 512, and 516 connected to the network 514. The client 504 includes a client resource usage module 506 and the server 508 includes a virtual conservation region indicator 509 and a system resource usage controller 510. The virtual conservation region indicator 509 can be configured to promote and indicate one or more green regions with the virtual universe. The system resource usage controller 510 can impose limitations and restrictions on green regions, on avatars that access the green regions, and on devices that support the green regions, such as the servers 508, 512, 516 the clients 502, 504, and the network 514. According to embodiments, the virtual universe resource conservation module client 506 can monitor energy usage by the client 504 and transmit the energy usage data to the server 508. The system resource usage controller 510 can also monitor energy usage by the server 508, and combine energy usage data from the server 508 with energy usage data obtained from the client resource usage module to determine comprehensive energy usage. In practice, there may be a different number of clients and servers. Also, in some instances, a client may perform the functions of a server and a server may perform the functions of a client. Any one of the clients 502, 504 and servers 508, 512 can be embodied as the computer system described in FIG. 6.

The clients 502 and 504 can be mainframes, minicomputers, personal computers, laptops, personal digital assistants, or the like. Additionally, the clients may be capable of connecting to the network 514. The clients 502 and 504 may transmit data over the network 514 or receive data from the network 514 via a wired, wireless, optical, or other connection. The virtual universe resource conservation module client 506 may be embodied in one or more client machines, possibly including one or more of the clients 502, 504. Further, the virtual universe resource conservation module client 506 may be embodied in a server, such as the server 508. For instance, servers can embody functionality (e.g., as code, a processing card, etc.) that can monitor energy usage by the client 502, 504. Functionality for monitoring energy usage can be embodied in one or more server machines or distributed as tasks to client machines accessing the virtual universe. For example, monitoring energy usage may be performed as a background task on client machines distributed by servers. Further, the virtual conservation region indicator 509 can be embodied in a client, such as the client 504.

Example Virtual Universe Resource Conservation Computer System

Figure 6:
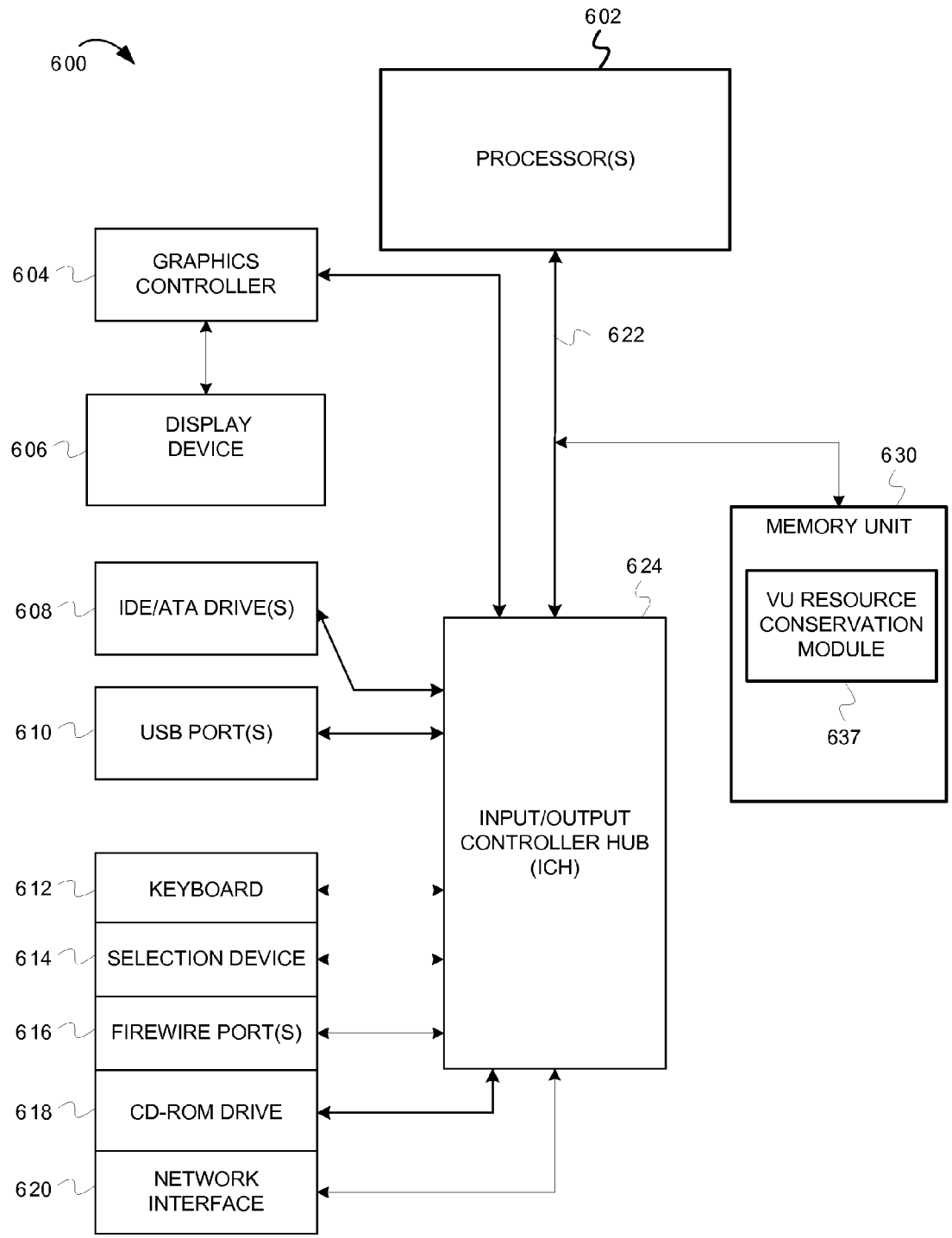
FIG. 6 is an illustration of an example computer system.

FIG. 6 is an illustration of an example virtual universe resource conservation computer system ("system") 600. As shown in FIG. 6, the computer system 600 may includes processor(s) 602, a memory unit 630, a processor bus 622, and an Input/Output controller hub (ICH) 624. The processor(s) 602, memory unit 630, and ICH 624 may be coupled to the processor bus 622. The processor(s) 602 may comprise any suitable processor architecture. The computer system 600 may comprise one, two, three, or more processors, any of which may execute a set of instructions in accordance with some embodiments.

The memory unit 630 may also include an I/O scheduling policy unit 632 and I/O schedulers 634. The memory unit 630 can store data and/or instructions, and may comprise any suitable memory, such as a dynamic random access memory (DRAM), for example. The computer system 600 may also include IDE drive(s) 608 and/or other suitable storage devices. A graphics controller 604 controls the display of information on a display device 606, according to some embodiments.

The input/output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. The ICH 624 can provide suitable arbitration and buffering for each interface.

For one embodiment, the ICH 624 provides an interface to one or more suitable integrated drive electronics (IDE) drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable medium that stores a set of instructions (e.g., software) embodying any one, or all, of the methodologies for control regions in a virtual universe that conserve natural resource usage. Furthermore, software can reside, completely or at least partially, within the memory unit 630 and/or within the processor(s) 602. The computer system 600 can also include a virtual universe resource conservation module 637. The virtual universe resource conservation module 637 can process communications, commands, or other information, to control regions in a virtual universe that conserve natural resource usage. Any component of the computer system 600 can be implemented as hardware, firmware, and/or machine-readable media including instructions for performing the operations described herein.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable storage medium having stored thereon instructions, which may be used to program a computer system (or other electronic device(s)) to perform a process according to embodiments, whether presently described or not, since every conceivable variation is not enumerated herein. A machine readable storage medium includes any tangible mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of media suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for controlling and managing virtual natural resource conservation region as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What claimed is:

1. A method for managing energy usage associated with a virtual universe, the method comprising the steps of:
    a computer determining a measure of comprehensive energy usage of a plurality of devices associated with a controlled energy use region in the virtual universe;
    the computer determining that the measure of comprehensive energy usage approaches a usage threshold for the controlled energy use region; and
    the computer imposing one or more conservation limitations on at least one of the plurality of devices to maintain the comprehensive energy usage within the usage threshold.

2. The method of claim 1, wherein said step of the computer determining that the measure of comprehensive energy usage approaches the usage threshold for the controlled energy use region comprises the steps of:
    the computer measuring energy usage using one or more monitoring devices associated with the plurality of devices, wherein the usage threshold is associated with an upper measurement limit of energy usage associated with the one or more monitoring devices; and
    the computer preventing the measure of comprehensive energy usage from exceeding the upper measurement limit of energy usage associated with the one or more monitoring devices.

3. The method of claim 2, wherein the one or more monitoring devices comprise any one or more of a gauge and a meter that measure any one or more of power usage and heat production of the plurality of devices.

4. The method of claim 1, wherein said step of the computer determining the measure of comprehensive energy usage of the plurality of devices associated with the controlled energy use region in the virtual universe comprises the step of:
    the computer determining any one or more of total energy usage by the plurality of devices, energy usage by the plurality of devices over a specified time period, energy usage by the plurality of devices per avatar within a region of the virtual universe, total energy usage derived from renewable energy sources, heat output, system resource utilization, a type of energy used, and an origin of energy used.

5. The method of claim 1, wherein said step of the computer imposing the one or more conservation limitations on the at least one of the plurality of devices to maintain the comprehensive energy usage within the usage threshold comprises the steps of:
    the computer determining energy efficiencies for the plurality of devices to identify which of the plurality of the devices are least energy efficient; and
    the computer imposing the one or more conservation limitations based on the energy efficiencies.

6. The method of claim 5, wherein the energy efficiencies comprise any one or more of over usage of energy over a time period, inefficient device metrics, high-power settings, and usage of energy from energy providers that have a high pollution rating.

7. The method of claim 1, wherein said step of the computer imposing the one or more conservation limitations on the at least one of the plurality of devices to maintain the comprehensive energy usage within the usage threshold comprises the step of:
    performing any one or more of reducing overall energy usage to operate the at least one of the plurality of devices, using energy from a renewable energy source accessible to the at least one of the plurality of devices, reducing heat production by the at least one of the plurality of devices, producing less virtual universe data to be processed, and delaying network communications between the plurality of devices.

8. One or more computer-readable tangible storage devices embodying a computer program product for managing energy usage associated with a virtual universe, said computer program product comprising:
   program instructions: stored on at least one of the one or more storage devices, to determine a measure of comprehensive energy usage of a plurality of devices associated with a controlled energy use region in the virtual universe;
   program instructions, stored on at least one of the one or more storage devices, to determine that the measure of comprehensive energy usage approaches a usage threshold for the controlled energy use region; and
   program instructions, stored on at least one of the one or more storage devices, to impose one or more conservation limitations on at least one of the plurality of devices to maintain the comprehensive energy usage within the usage threshold.

9. The one or more computer-readable tangible storage devices of claim 8, wherein the program instructions to said operation of determine that the measure of comprehensive energy usage approaches the usage threshold for the controlled energy use region measure energy usage using one or more monitoring devices associated with the plurality of devices, wherein the usage threshold is associated with an upper measurement limit of energy usage associated with the one or more monitoring devices; and prevent the measure of comprehensive energy usage from exceeding the upper measurement limit of energy usage associated with the one or more monitoring devices.

10. The one or more computer-readable tangible storage devices of claim 9, wherein the one or more monitoring devices comprise any one or more of a gauge and a meter that measure any one or more of power usage and heat production of the plurality of devices.

11. The one or more computer-readable tangible storage devices of claim 8, wherein the program instructions to determine the measure of comprehensive energy usage of the plurality of devices associated with the controlled energy use region in the virtual universe determine any one or more of total energy usage by the plurality of devices, energy usage by the plurality of devices over a specified time period, energy usage by the plurality of devices per avatar within a region of the virtual universe, total energy usage derived from renewable energy sources, heat output, system resource utilization, a type of energy used, and an origin of energy used.

12. The one or more computer-readable tangible storage devices of claim 8, wherein the program instructions to impose the one or more conservation limitations on the at least one of the plurality of devices to maintain the comprehensive energy usage within the usage threshold:
   determine energy efficiencies for the plurality of devices to identify which of the plurality of the devices are least energy efficient; and
   impose the one or more conservation limitations based on the energy efficiencies.

13. The one or more computer-readable tangible storage devices of claim 12, wherein the energy efficiencies comprise any one or more of over usage of energy over a time period, inefficient device metrics, high-power settings, and usage of energy from energy providers that have a high pollution rating.

14. The one or more computer-readable tangible storage devices of claim 8, wherein the program instructions to impose the one or more conservation limitations on the at least one of the plurality of devices to maintain the comprehensive energy usage within the usage threshold perform any one or more of reducing overall energy usage to operate the at least one of the plurality of devices, using energy from a renewable energy source assessable to the at least one of the plurality of devices, reducing heat production by the at least one of the plurality of devices, producing less virtual universe data to be processed, and delaying network communications between the plurality of devices.

15. A computer system for managing energy usage associated with a virtual universe, the computer system comprising:
   one or more processors, one or more computer-readable memories and one or more computer-readable tangible storage devices;
   program instructions, stored on at least one of the one or more storage devices for execution by at least one of the one or more processors via at least one of the one or more memories, to determine a measure of comprehensive energy usage of a plurality of devices associated with a controlled energy use region in the virtual universe;
   program instructions, stored on at least one of the one or more storage devices for execution by at least one of the one or more processors via at least one of the one or more memories, to determine that the measure of comprehensive energy usage approaches a usage threshold for the controlled energy use region; and
   program instructions, stored on at least one of the one or more storage devices for execution by at least one of the one or more processors via at least one of the one or more memories, to impose one or more conservation limitations on at least one of the plurality of devices to maintain the comprehensive energy usage within the usage threshold.

16. The computer system of claim 15 further comprising:
   program instructions, stored on at least one of the one or more storage devices for execution by at least one of the one or more processors via at least one of the one or more memories, to measure energy usage using one or more monitoring devices associated with the plurality of devices, wherein the usage threshold is associated with an upper measurement limit of energy usage associated with the one or more monitoring devices; and
   program instructions, stored on at least one of the one or more storage devices for execution by at least one of the one or more processors via at least one of the one or more memories, to prevent the measure of comprehensive energy usage from exceeding the upper measurement limit of energy usage associated with the one or more monitoring devices.

17. The computer system of claim 16 further comprising:
   program instructions, stored on at least one of the one or more storage devices for execution by at least one of the one or more processors via at least one of the one or more memories, to measure a first power usage amount from a first device;
   program instructions, stored on at least one of the one or more storage devices for execution by at least one of the one or more processors via at least one of the one or more memories, to measure a second power usage amount from a second device; and program instructions, stored on at least one of the one or more storage devices for execution by at least one of the one or more processors via at least one of the one or more memories, to combine the first power usage amount and the second power usage amount to determine the measure of comprehensive energy usage.

18. The computer system of claim 15 further comprising:
program instructions, stored on at least one of the one or more storage devices for execution by at least one of the one or more processors via at least one of the one or more memories, to determine any one or more of total energy usage by the plurality of devices, energy usage by the plurality of devices over a specified time period, energy usage by the plurality of devices per avatar within a region of the virtual universe, total energy usage derived from renewable energy sources, heat output, system resource utilization, a type of energy used, and an origin of energy used.

19. The computer system of claim 15 further comprising:
program instructions, stored on at least one of the one or more storage devices for execution by at least one of the one or more processors via at least one of the one or more memories, to determine energy efficiencies for the plurality of devices to identify which of the plurality of the devices are least energy efficient; and
program instructions, stored on at least one of the one or more storage devices for execution by at least one of the one or more processors via at least one of the one or more memories, to impose the one or more conservation limitations based on the energy efficiencies.

20. The computer system of claim 15 further comprising:
program instructions, stored on at least one of the one or more storage devices for execution by at least one of the one or more processors via at least one of the one or more memories, to perform any one or more of reducing overall energy usage to operate the at least one of the plurality of devices, using energy from a renewable energy source assessable to the at least one of the plurality of devices, reducing heat production by the at least one of the plurality of devices, producing less virtual universe data to be processed, and delaying network communications between the plurality of devices.

* * * * *